March 12, 1957
R. A. BUB ET AL
2,784,802
FOLDED FILTER ELEMENT
Filed May 4, 1955
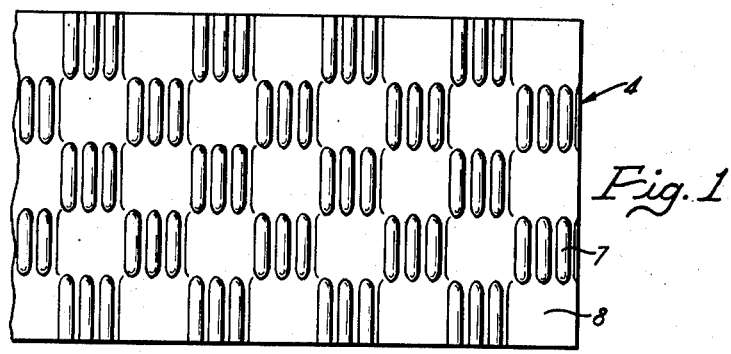
Fig. 1
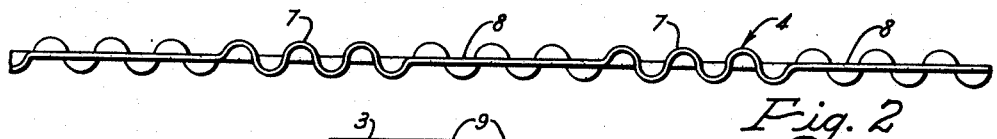
Fig. 2
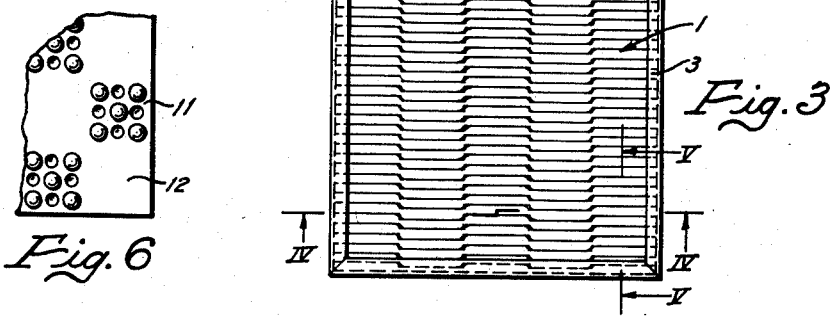
Fig. 3
Fig. 6
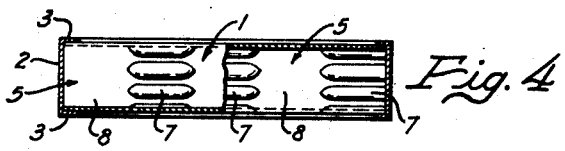
Fig. 4
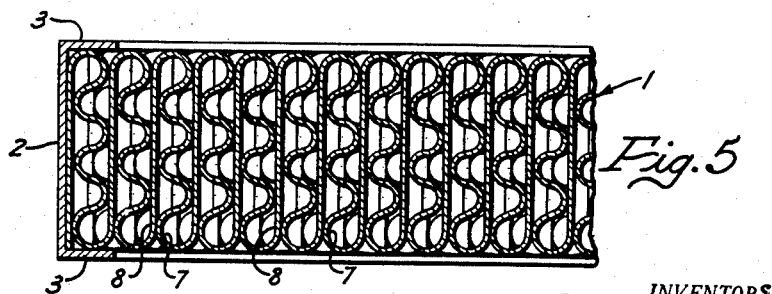
Fig. 5
INVENTORS
ROBERT A. BUB
& LESLIE SILVERMAN
BY
Brown, Critchlow, Flick & Peckham
THEIR ATTORNEYS

United States Patent Office

2,784,802
Patented Mar. 12, 1957

2,784,802

FOLDED FILTER ELEMENT

Robert A. Bub, Penn Township, Allegheny County, Pa., and Leslie Silverman, Dover, Mass., assignors to Mine Safety Appliances Company, Pittsburgh, Pa., a corporation of Pennsylvania Application May 4, 1955, Serial No. 505,876

3 Claims. (Cl. 183—71)

This invention relates to a folded filter element, such as one made from a single strip of filtering material.

It is among the objects of this invention to provide a folded filter element in which all of the material in the element is capable of filtering, in which separate spacers for separating the filter sheets are unnecessary, and in which sheet-separating spacers can be formed integrally with the sheets in a quick and easy manner.

In accordance with this invention a strip of filtering material is folded transversely back and forth upon itself to form a pack of substantially parallel filter sheets. Each sheet is in the form of a row of geometric areas, with alternate areas in each row provided with groups of projections on both sides of the sheet. These projection areas are separated by flat areas. When the projections are formed by corrugating the sheet, the corrugations preferably extend lengthwise of the rows; that is, transversely of the filter strip. The flat areas of alternate sheets are separated by the projection areas of the intervening sheet.

The invention is illustrated in the accompanying drawings, in which—

Fig. 1 is a plan view of a strip of filtering material corrugated and ready to be folded into the form of a filter element;

Fig. 2 is an enlarged side or edge view of the strip;

Fig. 3 is a plan view of a filter incorporating the folded filter element;

Fig. 4 is a cross section taken on the line IV—IV of Fig. 3;

Fig. 5 is an enlarged fragmentary cross section taken on the line V—V of Fig. 3; and Fig. 6 is a detail of a modification.

Referring to Fig. 3 of drawings, the filter consists of a rectangular filter element 1 of any desired size mounted in a suitable frame 2 that has narrow flanges 3 overlying the margins of the top and bottom of the filter element. The frame and filter element are fitted together in such a manner that all of the gas being filtered must flow through the element. The filter element is made in one piece from a long strip 4 of filtering material, as shown in Figs. 1 and 2, which may be any of the well-known materials used for such a purpose. At regular intervals the strip is folded transversely back and forth, accordion fashion, to provide a pack of substantially parallel filter sheets 5, as shown in Fig. 4. Each sheet extends across the strip; that is, across the filter element, and its depth is determined by the distance between the folds. This accordion or zigzag folding of a filter strip is old.

It is a feature of this invention that this filter does not require separate spacers between the filter sheets to hold them apart so that the gas being filtered can reach their surfaces on one side of the filter and leave their surfaces at the opposite side. Instead, the spacers are formed integrally with the filter sheets themselves; being formed preferably from corrugations with which the sheets are provided. It is not desirable to corrugate the filter strip lengthwise from end to end, because when it is folded the corrugations might nest together. The same thing might happen if the corrugations ran entirely across the strip, but even if they did not nest together the corrugations of adjoining sheets would touch each other and prevent the gas from flowing in between the sheets.

Therefore, in accordance with this inventon, each filter sheet is separated into or formed from a number of geometric areas that are arranged in a row extending across the filter element, and alternate areas 7 are provided with groups of parallel corrugations. The intervening areas 8 are flat. Preferably, the areas are rectangular, such as square. It will be seen that the corrugations extend lengthwise of the row. The reason for this is the difficulty in forming them between corrugating rolls if they extended lengthwise of the strip. Before the strip is folded, the corrugated areas in each row are located between the flat areas of the two adjoining rows so that the strip has a checkerboard appearance, as shown in Fig. 1. The strip is folded transversely along the sides of the rows, resulting in the flat areas of alternate filter sheets being spaced apart by the corrugated areas of the intervening sheet, as shown in Fig. 5. Because of this arrangement, any gas that enters the ends of the channels formed between the corrugations and the adjoining flat areas can filter through both of the corrugated areas and the flat areas. The gas can flow in between the sheets to reach the ends of those channels, because the sheets do not touch one another where the ends of the corrugations merge into the adjoining flat areas in the same row. The result is that, as shown in Fig. 3, spaces 9 are left that permit gas to flow in between the sheets and then laterally between them before filtering through the sheets.

In the modification shown in Fig. 6, groups of rounded projections 11 are substituted for the corrugations. These projections are formed by dimpling the sheets from opposite sides, so that the projections will extend from both sides of the dimpled areas. The dimpled or projection areas are separated by flat areas 12, as in the first embodiment. When the filter strip is folded, the flat areas of alternate sheets will be spaced apart by the projections 11 on the intervening sheet.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A folded filter element comprising a strip of filtering material folded transversely back and forth upon itself to form a pack of substantially parallel filter sheets, each sheet being formed from a row of geometric areas, alternate areas in each row being provided with groups of projections on both sides of the sheet and being separated by flat areas, and the flat areas of alternate sheets being separated by the projections on the intervening sheet, both sides of each flat area being engaged by the projections on the two adjoining sheets.

2. A folded filter element according to claim 1 in which said geometric areas are rectangular.

3. A folded filter element comprising a strip of filtering material folded transversely back and forth upon itself to form a pack of substantially parallel filter sheets, each sheet being formed from a row of geometric areas, alternate areas in each row being corrugated and separated by flat areas, the corrugations of said corrugated areas extending lengthwise of said rows, and the flat areas of alternate sheets being separated by the corrugated areas of the intervening sheet.

References Cited in the file of this patent

UNITED STATES PATENTS 2,569,243     Kovacs _____ Sept. 25, 1951

FOREIGN PATENTS 295,379     Switzerland _____ Mar. 1, 1954